(No Model.)
W. N. WHITELEY.
GRAIN WHEEL FOR HARVESTERS.
No. 297,544. Patented Apr. 22, 1884.
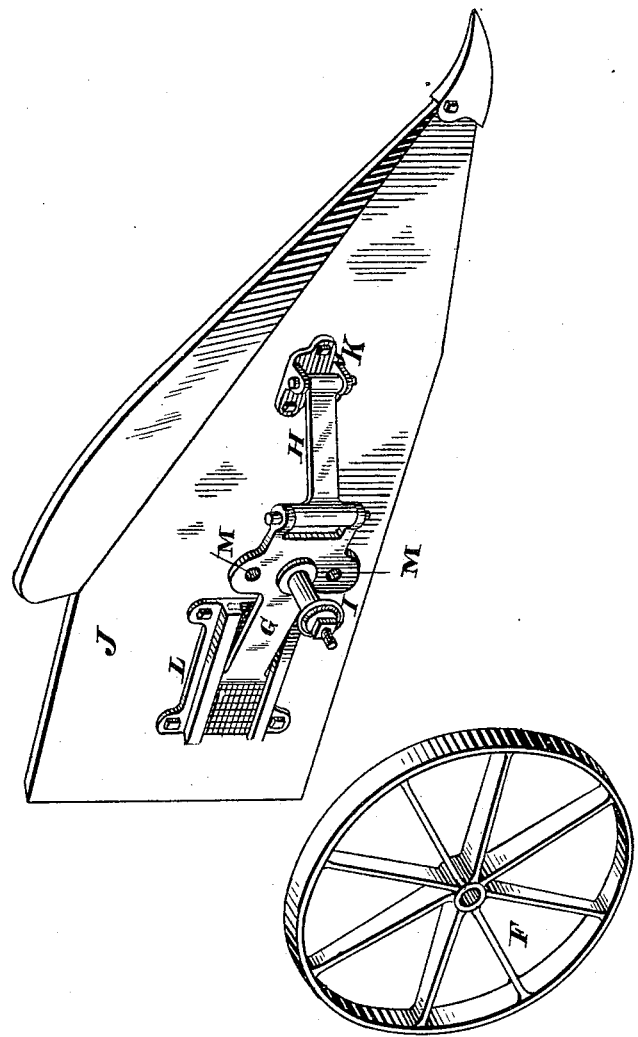
Attest
J Curtis Turner
D. P. Cowl
Inventor
William N. Whiteley
By his atty
T. D. Smith

UNITED STATES PATENT OFFICE.

WILLIAM N. WHITELEY, OF SPRINGFIELD, OHIO.

GRAIN-WHEEL FOR HARVESTERS.

SPECIFICATION forming part of Letters Patent No. 297,544, dated April 22, 1884.

Application filed June 19, 1883. Renewed March 15, 1884. (No model.)

*To all whom it may concern:*

Be it known that I, WILLIAM N. WHITELEY, of Springfield, in the county of Clark and State of Ohio, have invented a new and useful Improvement in Grain-Wheel Supports for Harvesting-Machines; and I do hereby declare that the following is a full and accurate description of the same, reference being had to the accompanying drawing, wherein my invention is represented in perspective, the grain-wheel being shown detached from its axle.

The grain-wheel F is supported by a knuckle-jointed arm, G H, to the part G of which the axle-stud I is attached. The part H is attached to the divider-board by the hinge-jaw K, and the free end of the part G travels in a longitudinal guide-plate, L, also secured to the side of the divider-board. The slide L is closed at its forward end, to limit the forward movement of the wheel and its knuckle-joint in its outward travel, and to insure a position from which it may return to the side of the divider. The axle-stud may be set at various heights, as may be desired, by means of the holes M, in either one of which said stud may be secured. The wheel F is thereby enabled to assume a position in the plane of the tangent of the curve being described by the outer end of the machine in turning without disturbing the points of support so much as in the case of the caster-wheel, and without plowing up the ground by sidewise drag, as in the case of those wheels where planes of rotation are fixed as to the machine.

Having described my invention, what I claim as new is—

A knuckle-jointed grain-wheel support consisting of the jointed bars G H, the bar H being hinged to the divider, combined with the guide L, wherein the end of the bar G may slide, substantially as herein described, to permit the grain-wheel to automatically adjust itself into the plane of the tangent of the curve being described by the outer end of the machine.

WILLIAM N. WHITELEY.

Witnesses:
C. J. HOLLOWAY,
P. W. KELLY.